Feb. 23, 1960 C. O. SLEMMONS ET AL 2,926,011
CIRCULAR AIR SPRING WITH VARIABLE CONTOUR PISTON
Filed Jan. 20, 1958
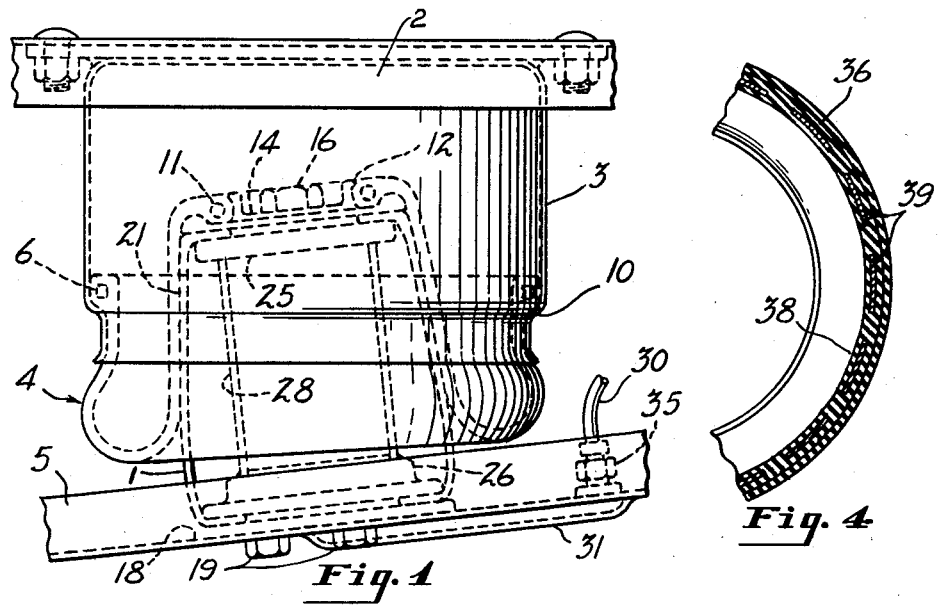
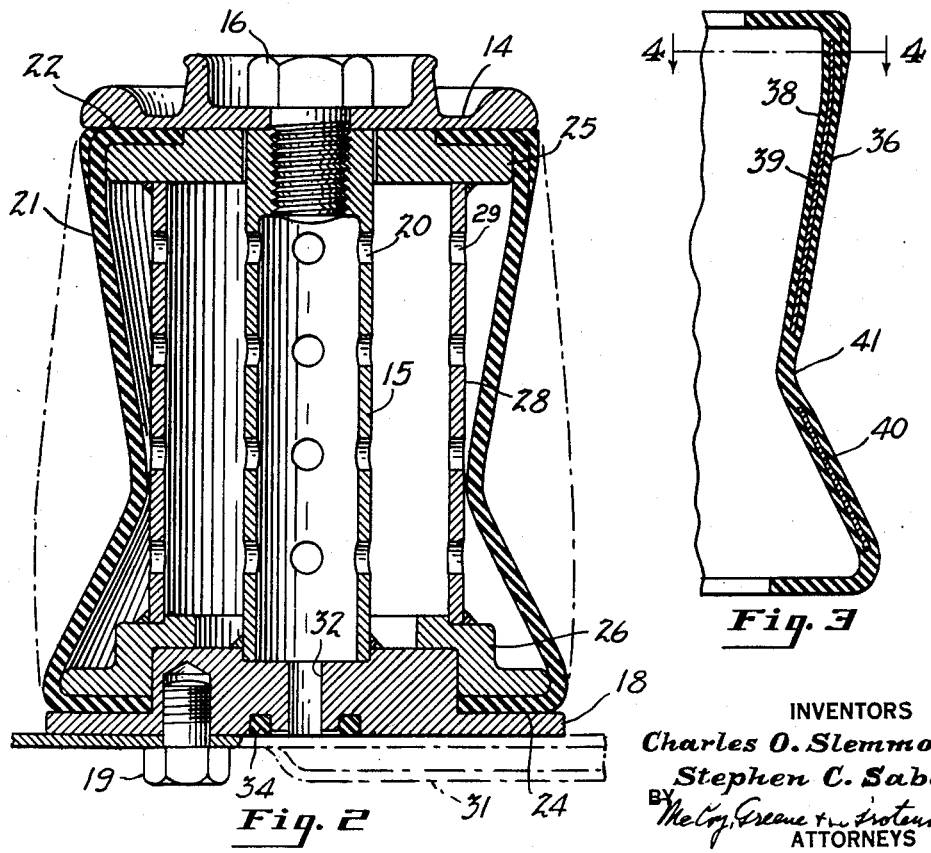
INVENTORS
Charles O. Slemmons
Stephen C. Sabo
BY
ATTORNEYS

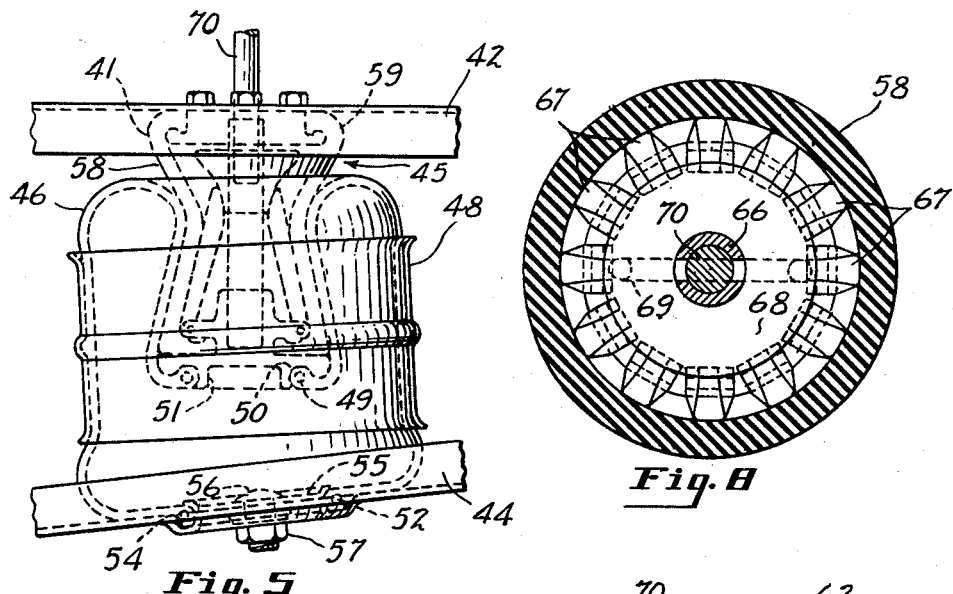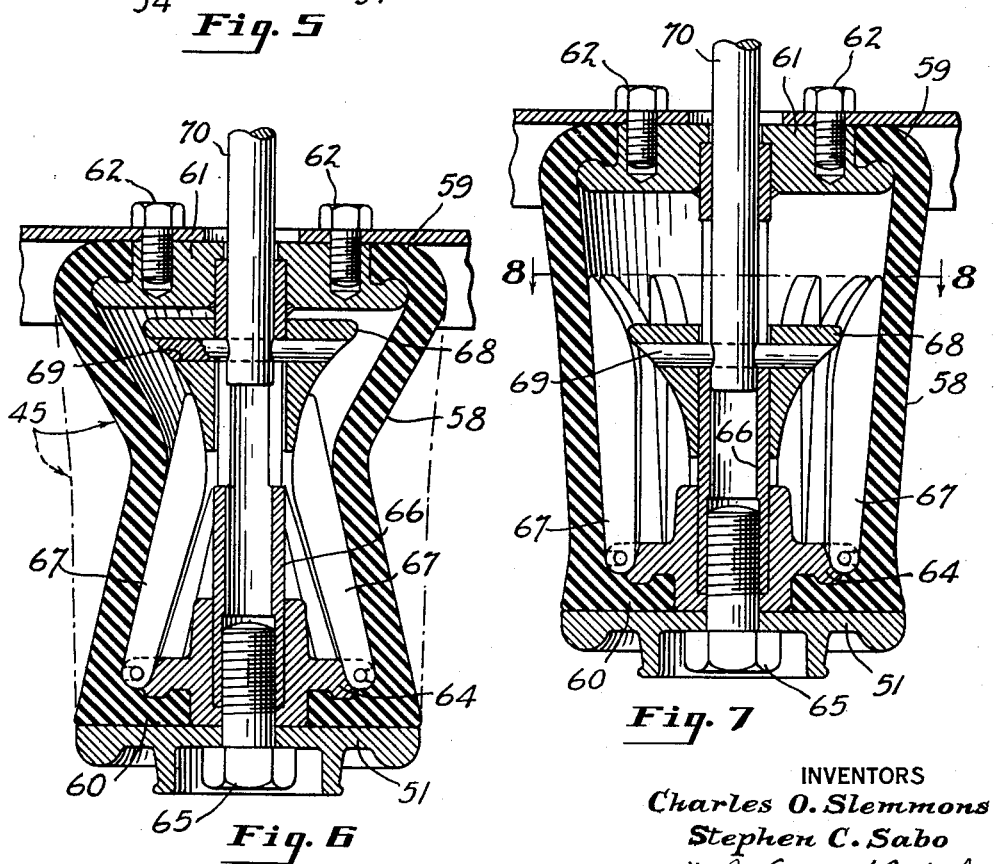

United States Patent Office 2,926,011
Patented Feb. 23, 1960

2,926,011

CIRCULAR AIR SPRING WITH VARIABLE CONTOUR PISTON

Charles O. Slemmons, Akron, and Stephen C. Sabo, Barberton, Ohio, assignors to The General Tire & Rubber Company, Akron, Ohio, a corporation of Ohio Application January 20, 1958, Serial No. 709,887

7 Claims. (Cl. 267—65)

The present invention relates to air springs or pneumatic suspension devices for use in automobile and other motor vehicle suspension systems.

Several of the forms of air springs presently being utilized feature a piston member which fits into a socket formed at one end of the diaphragm and works within a floating band or a fixed can with the contour of the piston member and arrangement of other parts being tailored to fit the curve called for by the suspension engineer.

Any such system has certain inherent limitations. One is the fact that in any specific installation the load on the air spring is subject to variation which is sometimes extreme. For example, when a station wagon has an air spring suspension system, the system must adjust to the wagon with no load and with a full load and provide a satisfactory ride in each instance. While air springs generally can accomplish this with more facility than the conventional coil spring and leaf spring arrangements, there is still no means for the vehicle operator to control the characteristics of the ride with the load.

Furthermore and equally important, each operator has definite opinions as to the kind of ride which he wants. The suspension engineer prescribes a ride which he hopes will satisfy the bulk of the purchasers of the vehicle. The individual vehicle operator, however, can do little or nothing to adjust and vary the ride of his vehicle to suit his personal preference or to allow for load or road conditions.

One object of the present invention is to provide means in an air spring suspension system by which the individual vehicle operator can adjust and vary the characteristics of the system.

Other advantages of the present invention will appear from the following drawings and description, in which:

Figure 1 is a side elevation of an air spring embodying the present invention mounted between the vehicle chassis and undercarriage;

Fig. 2 is an enlarged cross-section of the piston member of the air spring of Fig. 1;

Fig. 3 is a cross-section of a portion of the piston wall bladder;

Fig. 4 is a cross-section of the bladder of Fig. 3 taken along line 4—4;

Fig. 5 is a side elevation of an alternative form of piston mounted on a different type of air spring;

Fig. 6 is an enlarged cross-section of the piston member of Fig. 5 in the collapsed position;

Fig. 7 is a cross-sectional view of the piston member of Fig. 5 in the distended position;

Fig. 8 is a cross-sectional view taken along line 8—8 of Fig. 7.

In accordance with the present invention, we provide the piston member of an air spring with a variable side wall contour which is controlled by the operator of the vehicle or can be adjusted by a competent mechanic to the preference of the vehicle operator. Variation of the contour of the piston member varies the effective area of the piston member and diaphragm and directly effects the load curve and other characteristics of the air spring. As will be hereinafter shown, hydraulic or mechanical means may be utilized to effect this variation. The contour of the piston member of Figs. 1–4 is varied hydraulically. The contour of the piston member of Figs. 5–7 is varied mechanically.

The piston members of this invention may be used in any air spring featuring a piston member and a diaphragm which is provided with a piston member receiving socket at one end thereof. The diaphragm referred to is, of course, the one which defines at least a portion of the pressure chamber and is generally cord-reinforced rubber similar in construction to a tire carcass with beads at each end, one bead fitting a pocket in the face of the piston member, and the other fitting a groove in the can or member opposite from the piston member.

Fig. 1 shows a piston member 1 of the present invention mounted on a single diaphragm unit between the vehicle chassis or frame 2 and vehicle undercarriage 5. In this instance the piston member is mounted on the vehicle undercarriage and works with can 3 which is mounted on the chassis as shown. Rubber bladder or diaphragm 4 encloses the chamber in which the piston reciprocates. The can bead 6 of the bladder is held and sealed with the edge of the can against inwardly offset flange portion 10. The piston bead 11 is positioned in a groove or pocket 12 formed in the top piston plate 14.

Referring to Fig. 2, the piston member comprises a top face plate 14 which is bolted to upright, hollow, tubular member 15 with bolt 16. The bottom portion of the tubular member 15 is welded to seating plate 18 which in turn is bolted to the undercarriage 5 with bolt 19 as shown. The hollow tubular member is provided with a plurality of openings or holes 20 so as to have free access with the interior of the piston. A substantially cylindrical, pliable member 21 having turned-in end flange portions 22 and 24 is mounted between the face and base to form the piston walls. The top portion of the flange 22 is clamped between top face plate 14 and clamping ring 25 of the face and the bottom flange is clamped between clamping ring seat 26 and bottom plate 18 of the base. An outer tubular member 28 is welded to ring seat 26 to space apart the face and base and back up the piston walls. It is provided with openings 29 similar to those in the inner tubular member. Hydraulic fluid, such as brake fluid, enters the piston through line 30, travels through conduit 31 along the bottom of the undercarriage and enters the interior of hollow tubular member 15 through opening 32 in plate 18. O-ring 34 seals the juncture between plate 18 and the undercarriage. Connection 35 joins the fluid supply line 30 to the conduit 31 and may be undone when required.

When there is no appreciable pressure in the hydraulic system, the contour of the piston is illustrated by the solid lines of Fig. 2. As the hydraulic pressure is increased, the contour of the piston moves out to the ultimate bulging position as shown by the dotted lines of Fig. 2. As the contour of the piston moves out the effective area of the unit increases and the action of the unit stiffens. The effective area comprises the area of the face of the piston plus the plan or projected area of the surrounding concentric diaphragm portions acting with the piston. The diameter of the effective area is considered to extend out to the bottom of the rolling diaphragm curve adjacent the base of the piston. The effective area multiplied by the pressure in the pressure chamber gives the load supported by the air spring.

Details of the rubber piston wall are shown in Fig. 3. The wall consists of two plies of rubber 36 and 38 with intermediate metal stays 39 and 40. The plan view of Fig. 4 shows the disposition of the metal stays about the circumference of the wall. The fold 41 of the wall has no stay and folding action of the wall is concentrated at this portion. Other pliable rubberlike materials, such as polyurethane rubbers and even supported fabrics, may be used in place of rubber to form the pliable piston wall diaphragm member.

As an air spring goes from its normal position to its full jounce position, the unit pressure increases from normal pressure of 35 to 60 p.s.i. to a maximum of perhaps 120 or 150 p.s.i. When single can air springs are used, this rapid increase in pressure somtimes results in a jolting and relatively rough ride. In accordance with one aspect of the present invention, we balance the unit pressure in a variable contour piston, such as that of Figs. 1–4, against the internal pressure of the spring chamber and thereby modify the spring characteristics. More specifically, when the internal pressure increases rapidly, the piston contour decreases so as to decrease the effective area and automatically counter the increasing unit pressure. Thus if the average unit pressure in the air spring is 50 p.s.i., we set the pressure in the variable contour piston at say 75 p.s.i. This provides a large effective area for the piston up to the point at which the piston chamber forces counterbalance the expanding piston wall force so as to cause collapse of the piston wall. When it is desired to eliminate this effect, we set the pressure inside the piston substantially above the maximum air spring chamber pressure so that the piston wall assumes its greatest contour and stays there throughout variation of the air spring chamber pressure. For example and in such a case, the piston chamber pressure may be set at 175 or 200 p.s.i. when the maximum pressure in the chamber is 150 p.s.i.

The piston is preferably controlled with hydraulic fluid, such as brake fluid or similar fluids. However, it may also be controlled pneumatically as is apparent.

Fig. 5 shows an alternative form of the present invention in which the contour of the piston wall is varied mechanically. In Fig. 5 the piston member is shown in a floating band type air spring but it is to be understood that it can be adapted to other forms of air spring having a piston member, such as that shown in Fig. 1.

Referring to Fig. 5, the air spring is shown mounted between the vehicle chassis 42 and undercarriage 44 and comprises a piston member 45 mounted on the chassis, rubber diaphragm or bladder 46, and floating band 48. The upper bead 49 of the diaphragm fits in a seat 50 in the face plate 51 of the piston. The lower bead 52 fits in a receiving pocket 54 formed in the undercarriage. Plate 55 is clamped over the bead and drawn up with nut and bolt 56 and 57 as shown to keep the bead seated.

Referring to Fig. 6, the piston member comprises a relatively thick, pliable, wall-forming diaphragm 58 substantially cylindrical in shape provided with top and bottom, inwardly flanged portions 59 and 60. The upper flange portion of the piston diaphragm is clamped against the chassis by base clamping plate 61 which is in turn held and positioned against the chassis with machine screws 62. The lower flange portion of the diaphragm is clamped against the face plate 51 by finger plate 64 and machine screw 65. The chassis or clamping plate 61 and face plate 51 are spaced apart by a tubular spacer 66. Pivoted about the outer circumference of finger plate 64 and adjacent the inner circumference of the diaphragm are fingers 67 which have rounded end portions and nest with conical spreader member 68. Conical spreader member 68 is pinned by pin 69 to the end of control rod 70 extending up the center of spacer 66.

When the spreader member 68 is urged downward as shown in Fig. 7 it forces the fingers outward and expands the piston wall outward as shown in Fig. 7. Control rod 70 can be actuated mechanically, hydraulically or pneumatically, as desired. It can also be adjusted and set with a lock nut arrangement so that the rod 70 can be worked up and down with a wrench or other means and then locked in place. Thus the contour of each piston can be adjusted and set by a garage mechanic to suit the individual vehicle owner or it can be controlled from the instrument panel.

The piston of Figs. 5–7 distinguishes over that of Figs. 1–4 in that the contour or piston wall can be set positively at stations intermediate complete collapse as shown in Fig. 6 and expansion as shown in Fig. 7. Accurate control over the contour wall is thus obtained. The piston of Figs. 1–4 can also be set at intermediate stations but when there is large variation in the pressure in the pressure chamber or spiral tube, it tends to be less stable.

It is to be understood that in accordance with the provisions of the patent statutes, variations and modifications of the invention herein shown and described may be made with departing from the spirit thereof.

Having thus described our invention, we claim:

1. In an air spring having a diaphragm which defines at least a portion of a pressure chamber and which is provided with a piston member receiving socket at one end thereof, a piston member comprising a face portion, a base portion spaced from said face portion, a spacing member mounted between said face portion and base portion, a pliable substantially cylindrical diaphragm clamped at one end to the face portion and at the other end to the base portion to form the walls of the piston member, and means to expand said diaphragm outwardly to vary the contour of the piston walls.

2. In an air spring having a diaphragm which defines at least a portion of a pressure chamber and which is provided with a piston member receiving socket at one end thereof, a piston member comprising a face and base with a tubular member mounted therebetween to space apart said face and base, a substantially cylindrical diaphragm of rubberlike material mounted between said face and base to define the piston walls, a plurality of finger members pivoted adjacent the inner periphery of said diaphragm, and means to expand said finger members outwardly against the piston wall diaphragm to vary the contour of the piston walls.

3. In an air spring having a diaphragm which defines at least a portion of a pressure chamber and which has a socket at one end adapted to receive a piston, a piston comprising a face and base rigidly spaced apart, a substantially cylindrical diaphragm of rubberlike material mounted between the face and base to define the piston walls, and a source of fluid pressure connected to the interior of the cavity defined by said face, base and diaphragm so as to expand said diaphragm as desired to vary the piston wall contour.

4. An air spring for mounting between a vehicle frame and undercarriage comprising a piston member mounted on one of the frame and undercarriage, a diaphragm sealingly connected to the face of the piston and to the other of the frame and undercarriage so as to define a pressure chamber, and a floating band embracing the central portions of said diaphragm, said piston comprising a face portion, a base portion spaced from said face portion, a spacing member mounted between said face portion and base portion, a pliable substantially cylindrical diaphragm clamped at one end to the face portion and at the other end to the base portion to form the walls of the piston member, and means to expand said diaphragm outwardly to vary the contour of the piston walls.

5. An air spring for mounting between a vehicle frame and undercarriage comprising a piston mounted on one of the frame and undercarriage, a can mounted on the other of the frame and undercarriage, a substantially cylindrical diaphragm sealed at one end to the edge portions of the piston face and at the other end to the lips of the can to define a pressure chamber, said piston comprising a face portion, a base portion spaced from said face portion, a spacing member mounted between said face portion and base portion, a pliable substantially cylindrical diaphragm clamped at one end to the face portion and at the other end to the base portion to form the walls of the piston member, and means to expand said diaphragm outwardly to vary the contour of the piston walls.

6. An air spring for mounting between a vehicle frame and undercarriage comprising a piston member mounted on one of the frame and undercarriage, a diaphragm sealingly connected to the face of the piston and to the other of the frame and undercarriage so as to define a pressure chamber, a floating band embracing the central portions of said diaphragm, said piston comprising a face and base with a tubular member mounted therebetween to space apart said face and base, a substantially cylindrical diaphragm of rubberlike material mounted between said face and base to define the piston walls, a plurality of finger members pivoted adjacent the inner periphery of said diaphragm, and means to expand said finger members outwardly against the piston wall diaphragm to vary the contour of the piston walls.

7. An air spring for mounting between a vehicle frame and undercarriage comprising a piston mounted on one of the frame and undercarriage, a can mounted on the other of the frame and undercarriage, a substantially cylindrical diaphragm sealed at one end to the edge portions of the piston face and at the other end to the lips of the can to define the pressure chamber, said piston comprising a face and base rigidly spaced apart, a substantially cylindrical diaphragm of rubberlike material mounted between the face and base to define the piston walls, and a source of fluid pressure connected to the interior of the cavity defined by said face, base and diaphragm so as to expand said diaphragm as desired to vary the piston wall contour.

References Cited in the file of this patent

UNITED STATES PATENTS

| | | |
|---|---|---|
| 971,583 | Bell | Oct. 4, 1910 |
| 1,177,142 | Rudd | Mar. 28, 1916 |
| 1,538,420 | Church | May 19, 1925 |
| 2,869,891 | Venditty | Jan. 20, 1959 |

FOREIGN PATENTS

| | | |
|---|---|---|
| 457,730 | Great Britain | Dec. 4, 1936 |